United States Patent
Kim et al.

(10) Patent No.: US 11,311,901 B2
(45) Date of Patent: Apr. 26, 2022

(54) SEPARATOR COATING APPARATUS

(71) Applicant: SAMSUNG SDI CO., LTD., Yongin-si (KR)

(72) Inventors: Jinwoo Kim, Suwon-si (KR); Choong-Hyun Koo, Suwon-si (KR); Jinseong Park, Suwon-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 77 days.

(21) Appl. No.: 16/788,587

(22) Filed: Feb. 12, 2020

(65) Prior Publication Data
US 2020/0254474 A1    Aug. 13, 2020

(30) Foreign Application Priority Data
Feb. 13, 2019    (KR) .......................... 10-2019-0016740

(51) Int. Cl.
B05C 1/08    (2006.01)
(52) U.S. Cl.
CPC .......... B05C 1/0813 (2013.01); B05C 1/0808 (2013.01); B05C 1/0826 (2013.01); B05C 1/0865 (2013.01)
(58) Field of Classification Search
CPC ... B05C 1/0813; B05C 1/0808; B05C 1/0826; B05C 1/0865; D21H 23/56; D21H 23/38; C08J 7/04; H01M 50/449; H01M 50/403; H01M 50/446; B41F 9/10; B41F 9/1072
USPC .................. 118/304, 414, 256, 261
See application file for complete search history.

(56) References Cited

U.S. PATENT DOCUMENTS

| | | | | |
|---|---|---|---|---|
| 2,918,393 | A | * 12/1959 | Wommack | ............... B05D 7/04 427/428.2 |
| 2006/0016392 | A1 | * 1/2006 | Nojo | ..................... B05C 1/0817 118/258 |
| 2009/0246395 | A1 | * 10/2009 | Naruse | .................. B05C 1/0808 427/428.06 |
| 2015/0118389 | A1 | 4/2015 | Jang et al. | |
| 2015/0194652 | A1 | 7/2015 | Okihiro et al. | |

(Continued)

FOREIGN PATENT DOCUMENTS

| | | |
|---|---|---|
| CN | 104759388 A | 7/2015 |
| CN | 207271522 U | 4/2018 |
| JP | 2004-305982 A | 11/2004 |

(Continued)

OTHER PUBLICATIONS

Korean Office action dated Feb. 14, 2021.
Chinese Office action dated Apr. 12, 2021.
Chinese Office Action dated Jan. 26, 2022.

*Primary Examiner* — Laura Edwards
(74) *Attorney, Agent, or Firm* — Lee IP Law, P.C.

(57) ABSTRACT

A separator coating apparatus for coating an organic slurry on a separator, the apparatus including a coating bar that rotates in a transferring direction of the separator and coats the organic slurry on the separator; a bar holder spaced apart from the coating bar such that gap is present between the bar holder and the coating bar, the organic slurry being supplyable into the gap and onto the rotating coating bar; a coating block that supplies the organic slurry into the gap through a supply passage at both sides of the bar holder relative to the transferring direction of the separator; and a supporter that is on the bar holder and facing the coating bar.

13 Claims, 9 Drawing Sheets

(56) References Cited

U.S. PATENT DOCUMENTS

2017/0361283 A1    12/2017    Joo et al.

FOREIGN PATENT DOCUMENTS

| JP | 2009-082829 A | 9/2007 |
| JP | 2008-168200 A | 7/2008 |
| JP | 2013-43166 A | 3/2013 |
| JP | 5184914 B2 | 4/2013 |
| JP | 2015-139732 A | 8/2015 |
| KR | 10-0769530 B1 | 10/2007 |
| KR | 10-2015-0106812 A | 9/2015 |

* cited by examiner

SEPARATOR COATING APPARATUS

CROSS-REFERENCE TO RELATED APPLICATION

Korean Patent Application No. 10-2019-0016740, filed on Feb. 13, 2019, in the Korean Intellectual Property Office, and entitled: "Separator Coating Apparatus," is incorporated by reference herein in its entirety.

BACKGROUND

1. Field

Embodiments relate to a separator coating apparatus.

2. Description of the Related Art

A rechargeable battery is a battery that repeatedly undergoes charge and discharge, unlike a primary battery. A small-capacity rechargeable battery is used in a portable electronic device such as a mobile phone, a laptop computer, and a camcorder. A large-capacity and high-density rechargeable battery is used for a power source or energy storage for driving a motor of a hybrid vehicle and an electric vehicle.

The rechargeable battery includes an electrode assembly for charging and discharging a current, a case accommodating the electrode assembly, a cap plate coupled to an opening of the case, and an electrode terminal for drawing the electrode assembly out of the cap plate.

The electrode assembly may be provided with a negative electrode and a positive electrode at respective sides of a separator, which is an electrical insulating material, and the separator, the negative electrode, and the positive electrode may be formed to have a wound, stacked, or mixed structure thereof. The separator is an interlayer film that continuously maintains ion conductivity while separating the negative electrode and the positive electrode from each other in the electrode assembly, thereby enabling charge and discharge of the electrode assembly.

If the electrode assembly were exposed to a high temperature condition due to an abnormal operation of the rechargeable battery, the separator could be mechanically shrunk or damaged due to a melting characteristic at a low temperature.

In this case, the negative electrode and the positive electrode could contact each other such that the electrode assembly could ignite. A technique capable of suppressing the separator from being shrunk may help ensure stability of the electrode assembly.

SUMMARY

The embodiments may be realized by providing a separator coating apparatus for coating an organic slurry on a separator, the apparatus including a coating bar that rotates in a transferring direction of the separator and coats the organic slurry on the separator; a bar holder spaced apart from the coating bar such that gap is present between the bar holder and the coating bar, the organic slurry being supplyable into the gap and onto the rotating coating bar; a coating block that supplies the organic slurry into the gap through a supply passage at both sides of the bar holder relative to the transferring direction of the separator; and a supporter that is on the bar holder and facing the coating bar.

The supporter may be at a side of the coating bar relative to the transferring direction of the separator, and according to rotation of the coating bar, the supporter may contact and support the coating bar, or may be separated from the coating bar.

The bar holder may be parallel to the coating bar and may have a length set in a width direction of the separator, and the bar holder may include a first holder part at a side of the coating bar opposite to the separator to form a first gap between the bar holder and the coating bar, and a second holder part connected to the first holder part to form a second gap with a side portion of the coating bar relative to an inflow side of the separator.

The supporter may be on the first holder part to be supported in contact with or may be separated from the rotating coating bar.

An outer side surface of the supporter may be inclined at an angle with respect to a vertical line of a plane of the first holder part so as to correspond to a meniscus of the coating slurry.

An inner side surface of the supporter may be perpendicular to a plane of the first holder part, and an upper end of the inner side surface and an upper end of an outer side surface may form a supporting part that has an acute angle in a cross-sectional view and has a straight line shape in a longitudinal direction.

The supporter may be integrally formed and may extend along an entire length of the coating bar.

The supporter may include an evacuation groove that is alternately provided with the supporting part along an entire length of the coating bar.

A plurality of the supporters may be provided, and the plurality of supporters may be spaced apart from each other at a predetermined interval along an entire length of the coating bar.

An inner side surface of the supporter may be perpendicular to a plane of the first holder part, and an upper end of the inner side surface and an upper end of an outer side surface may form a supporting part that has a rounded shape in a cross-sectional view and has a straight line shape in a longitudinal direction.

An inner side surface of the supporter may be perpendicular to a plane of the first holder part, and a connecting part of an upper end of the inner side surface and an upper end of an outer side surface may be provided with a roller that has a straight line shape in a longitudinal direction.

An inner side surface of the supporter may be perpendicular to a plane of the first holder part, and a connecting part of an upper end of the inner side surface and an upper end of an outer side surface may form a screw shape in a roller that has a straight line shape in a longitudinal direction.

The embodiments may be realized by providing a separator coating apparatus for coating an organic slurry on a separator, the apparatus including a coating bar that rotates in a transferring direction of the separator and coats the organic slurry on the separator; a bar holder spaced apart from the coating bar such that gap is present between the bar holder and the coating bar, the organic slurry being supplyable into the gap and onto the rotating coating bar; a coating block that supplies the organic slurry into the gap through a supply passage at both sides of the bar holder relative to the transferring direction of the separator; and a supporter on the bar holder and facing the coating bar, the supporter extending a meniscus of organic slurry between the supply passage and the gap between the bar holder and the coating bar at an outflow side of the separator.

An outer side surface of the supporter may be inclined at an angle with respect to a vertical line of a plane of the bar holder so as to accommodate the meniscus of the organic slurry, and an inner side surface of the supporter may be connected to an upper end of the outer side surface and is parallel to the vertical line of the plane of the bar holder.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
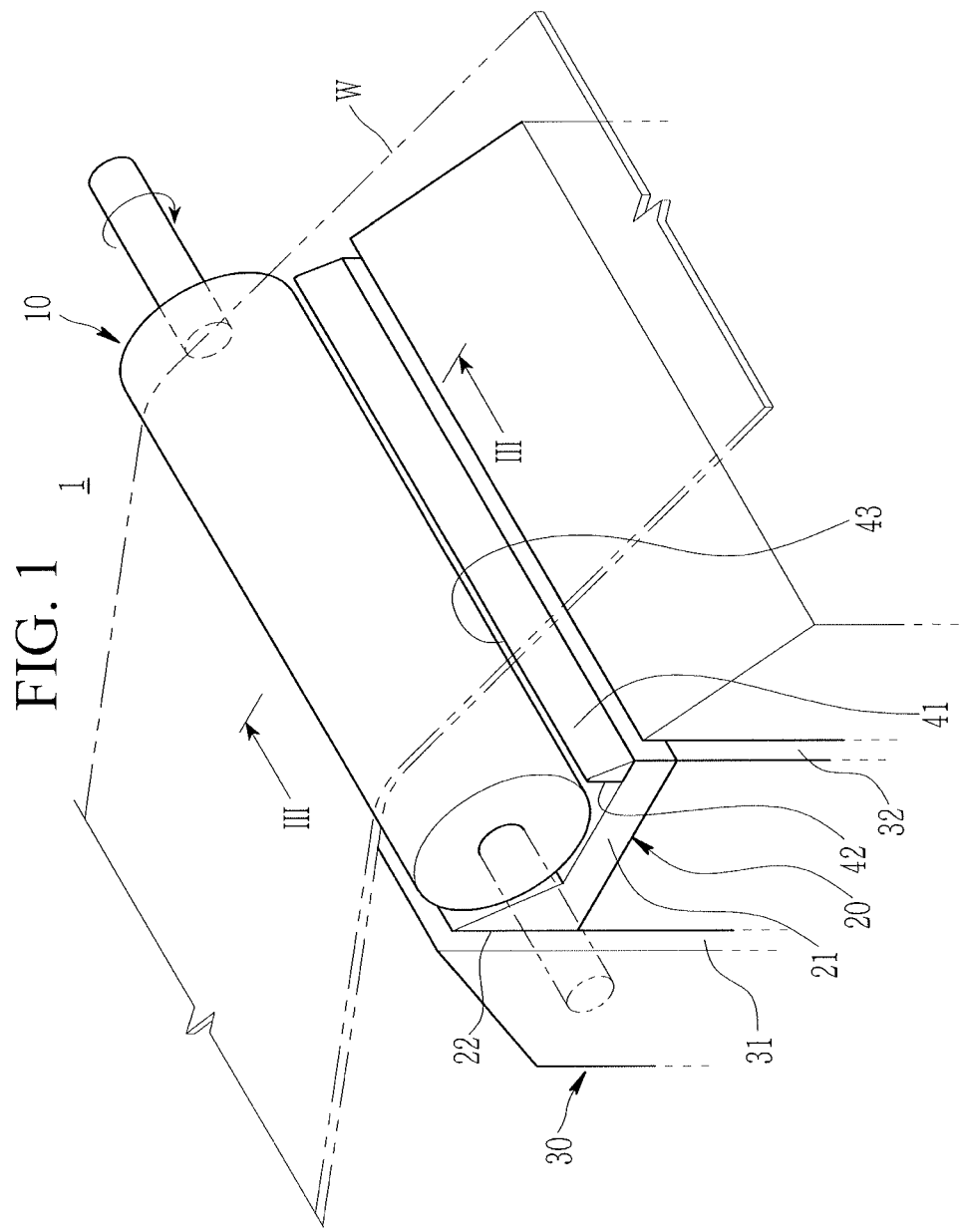
FIG. 1 illustrates a perspective view of a separator coating apparatus according to a first embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
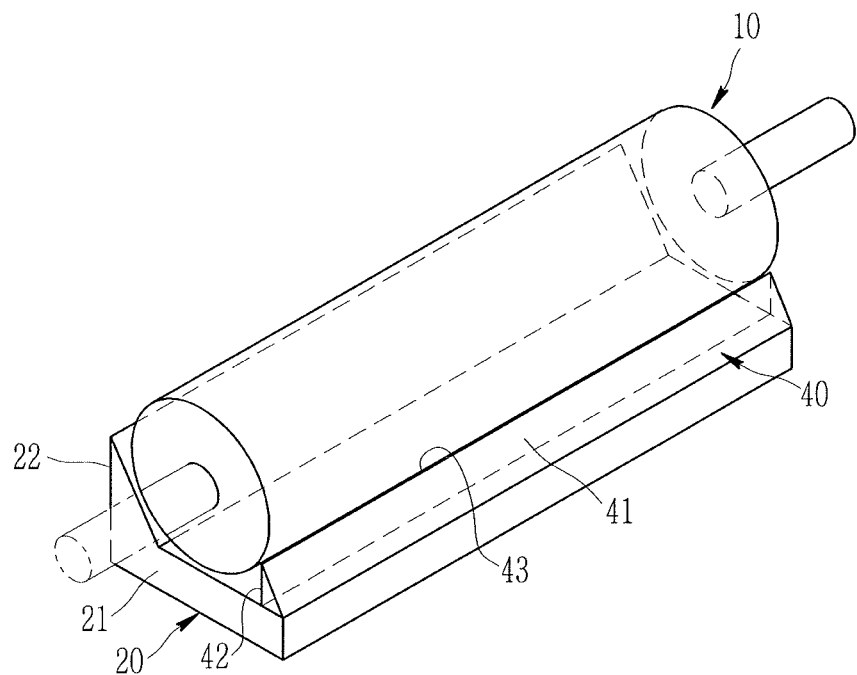
FIG. 2 illustrates a perspective view of a coating bar and bar holder of FIG. 1.
Figure 3:
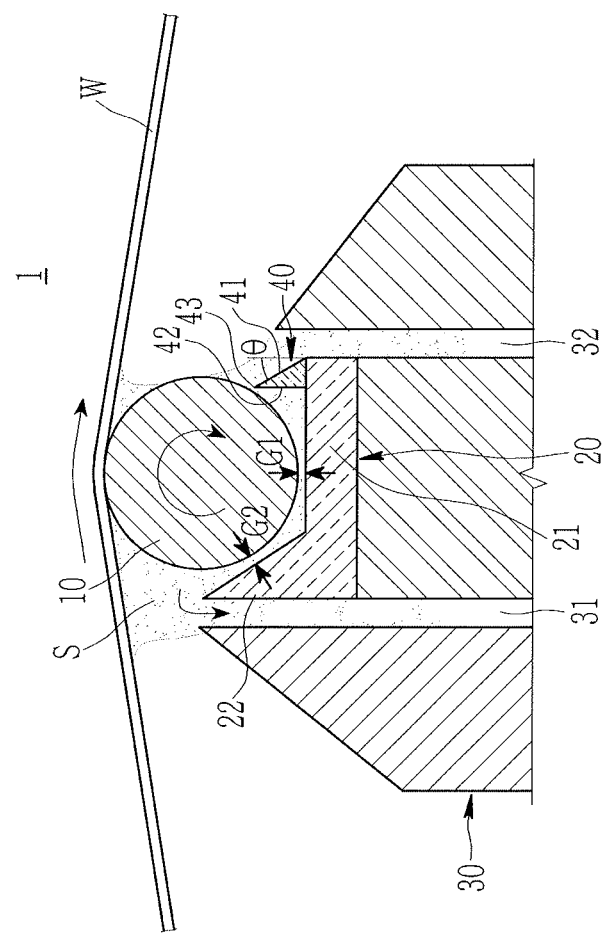
FIG. 3 illustrates a cross-sectional view taken along line of FIG. 1.

FIG. 1 illustrates a perspective view of a separator coating apparatus according to a first embodiment, FIG. 2 illustrates a perspective view of the coating bar and the bar holder of FIG. 1, and FIG. 3 illustrates a cross-sectional view taken along line of FIG. 1.

Referring to FIG. 1 to FIG. 3, a separator coating apparatus 1 of the first embodiment may include a coating bar 10, a bar holder 20, a coating block 30, and a supporter 40 to form a coating layer by coating a separator W with a slurry (e.g., an organic slurry) S including a binder and a filler (e.g., inorganic particles).

The coating bar 10 may coat the organic slurry S on one surface of the separator W while rotating in a transferring direction of the separator W, which is a coated body, to form a coating layer. In an implementation, the coating bar 10 may be a wireless coating bar having a round bar shape (as shown in the drawing figures), or may be a wire coating bar having a wire on a round bar.

In an implementation, the coating bar 10 may be supported and rotated by a supporting part and a driving part that are separately provided. In an implementation, the separator W may be supplied by an uncoiler, a recoiler, and supporting rolls separately provided, and may be recovered after the coating layer is formed.

In the first embodiment, the separator W may proceed from the left side to the right side of FIG. 1, and the coating bar 10 rotates in a clockwise direction. For example, the separator W and the coating bar 10 may be transferred and rotated in the same direction, and friction force between them may be minimized.

In an implementation, another separator coating apparatus of the first embodiment may be further provided (e.g., on an opposite side of the separator W), and the separator may further include a coating layer coated on the other side thereof by an organic slurry coated with a coating bar. For example, the coating layer may be provided on one side or both sides of the separator.

In an implementation, the supporting part and the driving part may rotate the coating bar 10, and a gap may be between the bar holder 20 and the coating bar 10 so that the coating bar 10 may be rotated. The bar holder 20 may be configured to supply the organic slurry S to the coating bar 10.

The coating block 30 may be configured to supply the organic slurry S to the coating bar 10 via the bar holder 20 through supply passages 31 and 32 at respective sides of the bar holder 20 (e.g., at respective sides of the coating bar 10 relative to the rotation direction of the coating bar 10).

The supporter 40 may be on the bar holder 20 adjacent to the coating bar 10. The supporter 40 may temporarily contact and support the coating bar 10, or may be separated from the coating bar 10 at the side where the separator W is separated from the coating bar 10 in the transferring direction as the coating bar 10 rotates.

In an implementation, as the separator W proceeds, the coating bar 10 may be pulled or bent to one side (e.g., toward an outflow side of the separator W along the transferring direction of the separator W). The supporter 40 may be provided at the side of the coating bar 10 in a direction in which the coating bar 10 may be pulled or bent, and may support the coating bar 10 (e.g., while repeatedly being brought into contact with and separated from the rotating coating bar 10). For example, the coating bar 10 may be pulled or bent within an allowable or predetermined range and may not be pulled or bent over or beyond the allowable or predetermined range. For example, the supporter 40 may act as a barrier that helps prevent excessive movement or displacement of the coating bar 10 in the transferring direction of the separator W.

The bar holder 20 may have a length set in a width direction of the separator W (e.g., a direction orthogonal to the transferring direction of the separator W) while being parallel to the coating bar 10. For example, the bar holder 20 may include a first holder part 21 and a second holder part 22 to supply the organic slurry S to the coating bar 10. The second holder part 22 may be connected to the first holder part at an inflow side of the separator W.

The first holder part 21 may be below the coating bar 10 (e.g., opposite to a side of the coating bar 10 that faces or contacts the separator W) to form a first gap G1 between the first holder part 21 and a lower portion of the coating bar 10 (e.g., to help guide the organic slurry S supplied through the supply passage 32 to the coating bar 10 and the second holder part 22). In an implementation, the supporter 40 may facilitate the supply of the organic slurry S to a second gap G2 (e.g., between the second holder part 22 and the coating bar 10) while supporting the rotating coating bar 10.

The second gap G2 may be between the second holder part 22 and a side surface of the coating bar 10 at the inflow side of the separator W. The second holder part 22 may help guide the organic slurry supplied from the first holder part 21 to the coating bar 10.

In an implementation, the second holder part 22 may help further guide the organic slurry S to the supply passage 31 through or at the other side surface to the coating bar 10.

The organic slurry S supplied to the second gap G2 and the supply flow passage 31 may be supplied to the inflow side of the proceeding separator W, and may be coated on the separator W where the separator W and the coating bar 10 meet at the inflow side of the separator W.

For example, the supporter 40 may be on the first holder part 21 to contact and support or be separated from the rotating coating bar 10. In an implementation, the supporter 40 may extend a meniscus of the organic slurry (S) connecting the supply passage 32 and the coating bar 10 at the outflow side of the proceeding separator W. For example, the supporter 40 may help even out the supply of slurry to the separator by making the supply of the slurry uniform from the supply passage 32 toward the separator W. For example, the supporter 40 may help ensure that the slurry from the supply passage 32 is provided to the separator W such that slurry in the meniscus is constantly turned over (e.g., supplied and replaced) and does not have the opportunity to stagnate in the meniscus, thereby avoiding the undesirable drying and/or hardening of the slurry.

The supporter 40 may include an outer side surface 41 and an inner side surface 42. The outer side surface 41 may be inclined toward the coating bar 10 at a predetermined angle θ with respect to a vertical line of a plane of the first holder part 21 so as to correspond to the meniscus of the coating slurry S formed in or provided by the supply passage 32.

For example, the outer side surface 41 may extend and may uniformly form the meniscus of the organic slurry S with respect to the coating bar 10 while upwardly supplying the organic slurry S supplied from the supply passage 32 to the coating bar 10.

The inner side surface 42 may be connected to or abut the outer side surface 41 at an upper end of the outer side surface 41 and may be perpendicular to a plane of the first holder part 21. For example, the organic slurry S that extends and uniformly forms the meniscus may be smoothly supplied to the first gap G1 through or along the inner side surface 42 that is vertical via an upper end of the supporter 40.

The inclination angle θ of the outer side surface 41 may be formed at a maximum within a range that uniformly maintains the meniscus of the organic slurry S, and may also be coated to be set at a minimum in a range not connected to the organic slurry S that proceeds to the outflow side of the separator W.

In the supporter 40 of the first embodiment, the upper end of the inner side surface 42 and the upper end of the outer side surface 41 may form a supporting part 43 that forms an acute angle in a cross-sectional view (see FIG. 3) and may have a straight line shape in a longitudinal direction (see FIG. 2). In an implementation, the supporter 40 is integrally formed (e.g., as a one-piece, monolithic unit) along an entire length of the coating bar 10.

As the coating bar 10 is pulled or bent to one side as the separator W proceeds, the supporter 40 may contact the coating bar 10 at some points along its length and may be separated from the coating bar 10 at some other points along its length. For example, the contact/separation may be repeated at various positions along the entire length of the supporter 40.

For example, the meniscus of the organic slurry S may be stably maintained at the outflow side of the proceeding separator W. For example, and excessive amount of the organic slurry S may not accumulate between the coating bar 10 and the supporter 40 at the outflow side of the separator W, and thus the organic slurry S may not have a chance to dry out or harden, prior to being fed toward the separator W and applied thereto. For example, it is possible to prevent the organic slurry S from hardening at one side of the coating bar 10 (e.g., at the outflow side of the separator W), and the black spot defects may be prevented in the coating layer of the separator W.

Hereinafter, various embodiments will be described. Compared with the first embodiment and the previously described embodiments, repeated descriptions of the same configurations may be omitted and different configurations will be described.

Figure 4:
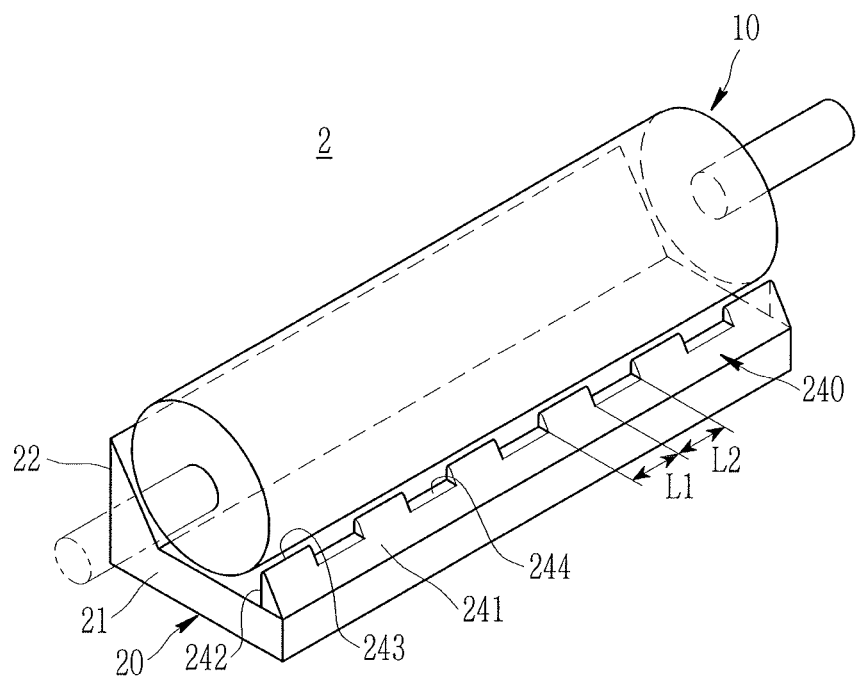
FIG. 4 illustrates a perspective view of a coating bar and a bar holder of a separator coating apparatus according to a second embodiment.

FIG. 4 illustrates a perspective view of a coating bar and a bar holder of a separator coating apparatus according to a second embodiment. Referring to FIG. 4, in a separator coating apparatus 2 of the second embodiment, a supporter 240 may include a supporting part 243 and an evacuation groove 244 that are alternately formed along the entire length of the supporter 240 (which corresponds with the entire length of the coating bar 10). The supporting part 243 and the evacuation groove 244 may be formed to have various lengths L1 and L2, respectively (e.g., as measured along the lengthwise direction of the supporter 240).

When the supporter 240 supports the coating bar 10, the supporting part 243 (formed by or at a connection point of upper ends of the outer side surface 241 and the inner side surface 242) may support the coating bar 10 (when in contact with the coating bar 10) and may be separated from the coating bar 10, thereby extending and maintaining the meniscus of the organic slurry S (e.g., stabilizing the supply of the slurry to the separator W in a manner such that the slurry is not sitting stagnant and undesirably dried or hardened).

The evacuation groove 244 may accommodate an excess of the organic slurry S guided to the supporting part 243, and it is possible to prevent the meniscus of the organic slurry S from being excessively extended by the supporting part 243.

In an implementation, the evacuation groove 244 may supply a large amount of the organic slurry S, and the supporting part 243 may supply a relatively small amount of the organic slurry S. By the interaction of the evacuation groove 244 and the supporting part 243, the organic slurry S supplied from the supply passage 32 may be stably supplied to the second gap G2 and the coating bar 10.

As the coating bar 10 is pulled or bent to one side according to the proceeding of the separator W, the supporter 240 may substantially contact the coating bar (e.g., at the supporting part 243) along the entire length area and may be separated from the coating bar at the evacuation groove 244, and this may be alternated and/or repeated along the entire length.

For example, the meniscus of the organic slurry S may be stably maintained at the outflow side of the proceeding separator W. For example, it is possible to prevent the organic slurry S from hardening at one side of the coating bar 10 of the outflow side, and the black spot defects may be prevented in the coating layer of the separator W.

Figure 5:
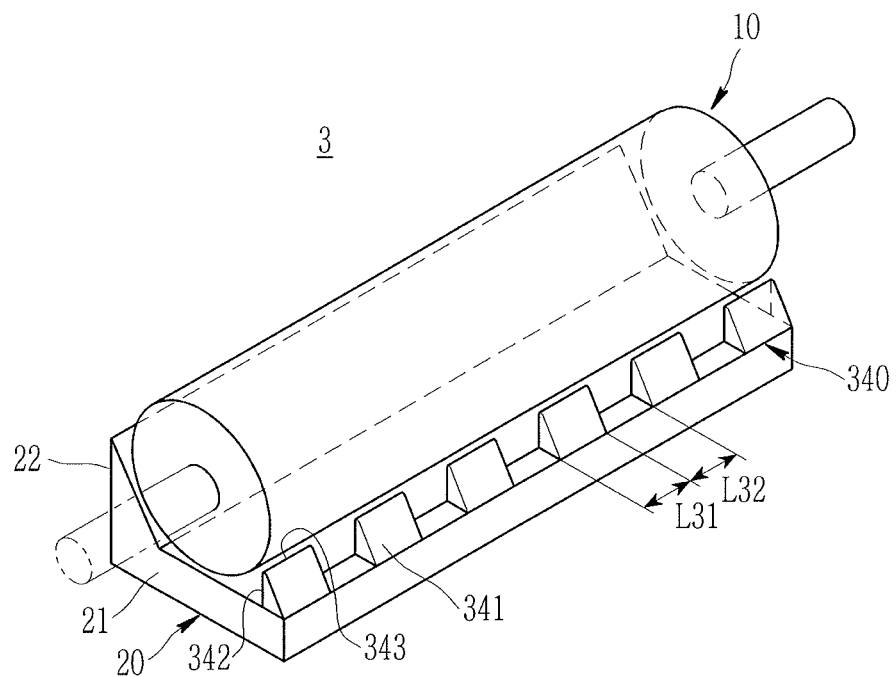
FIG. 5 illustrates a perspective view of a coating bar and a bar holder of a separator coating apparatus according to a third embodiment.

FIG. 5 illustrates a perspective view of a coating bar and a bar holder of a separator coating apparatus according to a third embodiment. Referring to FIG. 5, in a separator coating apparatus 3 of the third embodiment, a plurality of supporters 340 may be provided, and they may be spaced apart from each other with a predetermined gap therebetween along a lengthwise direction of the coating bar 10. A length L31 of each supporter 340 and an interval L32 between the supporters 340 may be variously formed, respectively.

When the supporter 340 supports the coating bar 10, a supporting part 343 formed by or at a connection of upper ends of an outer side surface 341 and an inner side surface 342 may support the coating bar 10 (while in contact with the coating bar 10) or may be separated from the coating bar 10, thereby extending and maintaining the meniscus of the organic slurry S.

The interval L32 between the supporter 340 may accommodate an excess of the organic slurry S, and it is possible to prevent the meniscus of the organic slurry S from being excessively extended by the supporting part 343.

When the interval L32 between the supporter 340 in the third embodiment is the same as the interval L2 of the evacuation groove 244 in the second embodiment, the excess of the organic slurry S may be more effectively accommodated than the evacuation groove 244 due to a depth difference.

Figure 6:
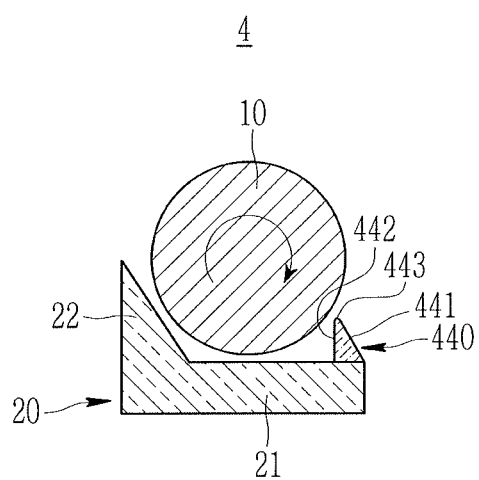
FIG. 6 illustrates a cross-sectional view of a coating bar and a bar holder of a separator coating apparatus according to a fourth embodiment.

FIG. 6 illustrates a cross sectional view of a coating bar and a bar holder of a separator coating apparatus according to a fourth embodiment. Referring to FIG. 6, in a separator coating apparatus 4 of the fourth embodiment, an inner side surface 442 of a supporter 440 may be perpendicular to the plane of the first holder part 21.

An upper end of the inner side surface 442 and an upper end of an outer side surface 441 may be roundly connected in a cross-sectional view (e.g., may be rounded), and form a rounded supporting part 443 that is straight in a longitudinal direction. The cross-sectional rounded support 443 may smoothly contact and support the coating bar 10.

In addition, the supporting part 443 may extend and uniformly form the meniscus of the organic slurry S while more smoothly supplying the organic slurry S supplied from the supply passage 32 to the coating bar 10.

Figure 7:
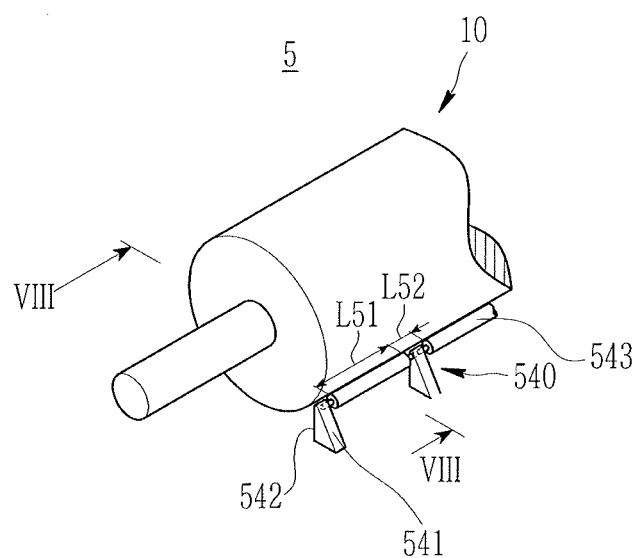
FIG. 7 illustrates a partial perspective view of a coating bar and a bar holder of a separator coating apparatus according to a fifth embodiment.
Figure 8:
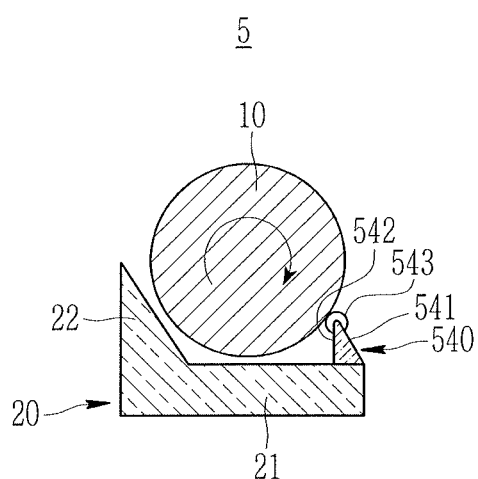
FIG. 8 illustrates a cross-sectional view taken along line VIII-VIII of FIG. 7.

FIG. 7 illustrates a partial perspective view of a coating bar and a bar holder of a separator coating apparatus according to a fifth embodiment, and FIG. 8 illustrates a cross-sectional view taken along line VIII-VIII of FIG. 7.

Referring to FIG. 7 and FIG. 8, in a separator coating apparatus 5 of the fifth embodiment, an inner side surface 542 of a supporter 540 may be perpendicular to the plane of the first holder part 21.

A connecting part of an upper end of the inner side surface 542 and an upper end of an outer side surface 541 may be provided with a roller 543 that is straight in a longitudinal direction. The roller 543 may smoothly contact and support the coating bar 10.

The roller 543 may extend and uniformly form the meniscus of the organic slurry S while more smoothly supplying the organic slurry S from the supply passage 32 to the coating bar 10.

In an implementation, the supporter 540 may include a plurality of rollers 543, and the rollers may be spaced apart by a predetermined interval L52 along the entire length of the supporter 540 (e.g., corresponding with the entire length of the coating bar 10). A length L51 between and the interval L52 of the rollers 543 in the fifth embodiment may be variously formed, respectively.

The roller 543 may smoothly contact with and support the coating bar 10.

In an implementation, the interval L52 of or between the rollers 543 may help evacuate an excess of the organic slurry S guided to the roller 543, and it is possible to prevent the meniscus of the organic slurry S from being excessively extended by the roller 543.

Figure 9:
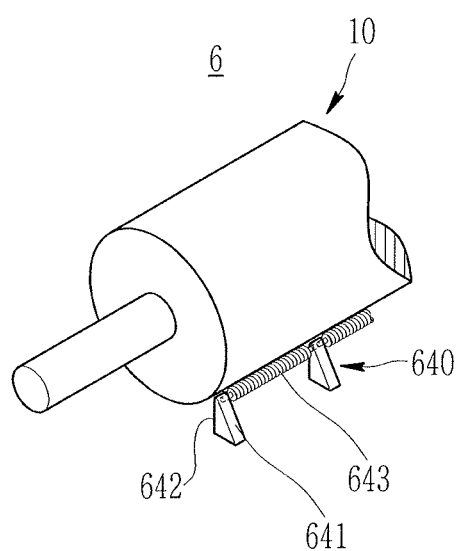
FIG. 9 illustrates a partial perspective view of a coating bar and a bar holder of a separator coating apparatus according to a sixth embodiment.

FIG. 9 illustrates a partial perspective view of a coating bar and a bar holder of a separator coating apparatus according to a sixth embodiment. Referring to FIG. 9, in a separator coating apparatus 6 of the sixth embodiment, an inner side surface 642 of a supporter 640 may be perpendicular to the plane of the first holder part 21.

A connecting part of an upper end of the inner side surface 642 and an upper end of an outer side surface 641 may have a screw in a roller 643 (that may be otherwise straight in a longitudinal direction). The roller 643 having the screw may be supported in many line contacts to the coating bar 10 as compared to the roller 543 in the fifth embodiment.

The roller 643 having the screw may extend and uniformly form the meniscus of the organic slurry S while supplying the organic slurry S from the supply passage 32 to the coating bar 10.

By way of summation and review, thermal resistance of a separator may be improved by coating the separator with an organic slurry in which a filler with inorganic particles having high thermal resistance and an adhesive binder are mixed.

For example, a separator coating apparatus may be configured to coat an organic slurry on the separator to form a coating layer. The separator coating apparatus may include a coating bar for coating the organic slurry on the separator while transferring the separator, a bar holder for supplying the organic slurry by rotation of the coating bar, and a coating block for supplying the organic slurry to the bar holder and the coating bar via a supplying flow passage directed to respective sides of the bar holder.

As the separator proceeds, the organic slurry supplied while the coating bar is rotated in a proceeding direction may be supplied to the coating bar, and the organic slurry supplied by the rotation of the coating bar is coated on the separator.

For example, the bar holder may be provided with a groove that is upwardly opened toward the coating bar, and the coating bar may be stably supported. A meniscus of the organic slurry could become unstable at a portion in which the separator is separated from the coating bar (at an outflow side of the proceeding separator).

For example, the meniscus of the organic slurry could become unstable (e.g., stagnant) at the portion in which the separator and the coating bar are separated, and the organic slurry could be hardened (e.g., dried) at the outflow side of the separator. The hardened organic slurry could eventually be included in the organic slurry coated on the separator to cause black spot defects of the organic slurry.

One or more embodiments may provide a separator coating apparatus that may stably maintain a meniscus of an organic slurry including a binder and a filler at a portion in which a separator and a coating bar are separated (at the outflow side of a proceeding separator).

One or more embodiments may provide a separator coating apparatus that stably maintains a meniscus of an organic slurry in a portion in which a separator and a coating bar are separated (at the outflow side of the proceeding separator).

One or more embodiments may provide a separator coating apparatus that stably maintains the meniscus of the organic slurry to help prevent the organic slurry from being hardened, thereby preventing black spot defects from occurring in a coating layer of the separator.

For example, according to the embodiment, a supporter may be between a coating bar and a bar holder, so that the meniscus of an organic slurry may be stably maintained in a portion in which a separator and the coating bar are separated (at the outflow side of the proceeding separator).

For example, according to the embodiment, the supporter may help stably maintain the meniscus of the organic slurry while being temporarily in contact with or separated from the coating bar at a side (the outflow side of the proceeding separator) where the separator is separated from the coating bar in a transferring direction according to rotation of the coating bar.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A separator coating apparatus for coating an organic slurry on a separator, the apparatus comprising:
   a coating bar that rotates in a transferring direction of the separator and coats the organic slurry on the separator;
   a bar holder spaced apart from the coating bar such that a gap is present between the bar holder and the coating bar, the organic slurry being supplyable into the gap and onto the rotating coating bar;
   a coating block that supplies the organic slurry into the gap through a supply passage at both sides of the bar holder relative to the transferring direction of the separator; and
   a supporter that is on the bar holder and facing the coating bar,
   wherein an outer side surface of the supporter is inclined with respect to a vertical line of a plane of the bar holder so as to correspond to a meniscus of the organic slurry.

2. The separator coating apparatus of claim 1, wherein:
   the supporter is at a side of the coating bar relative to the transferring direction of the separator, and
   according to rotation of the coating bar, the supporter:
   contacts and supports the coating bar, or
   is separated from the coating bar.

3. The separator coating apparatus of claim 1, wherein:
   the bar holder is parallel to the coating bar and has a length set in a width direction of the separator, and
   the bar holder includes:
   a first holder part at a side of the coating bar opposite to the separator to form a first gap between the bar holder and the coating bar, and
   a second holder part connected to the first holder part to form a second gap with a side portion of the coating bar relative to an inflow side of the separator.

4. The separator coating apparatus of claim 3, wherein the supporter is on the first holder part to be supported in contact with or be separated from the rotating coating bar.

5. The separator coating apparatus of claim 4, wherein:
   an inner side surface of the supporter is perpendicular to a plane of the first holder part, and
   an upper end of the inner side surface and an upper end of the outer side surface form a supporting part that has an acute angle in a cross-sectional view and has a straight line shape in a longitudinal direction.

6. The separator coating apparatus of claim 5, wherein the supporter is integrally formed and extends along an entire length of the coating bar.

7. The separator coating apparatus of claim 5, wherein the supporter includes an evacuation groove that is alternately provided with the supporting part along an entire length of the coating bar.

8. The separator coating apparatus of claim 5, wherein:
   a plurality of the supporters are provided, and
   the plurality of supporters are spaced apart from each other at a predetermined interval along an entire length of the coating bar.

9. The separator coating apparatus of claim 4, wherein:
   an inner side surface of the supporter is perpendicular to a plane of the first holder part, and
   an upper end of the inner side surface and an upper end of the outer side surface form a supporting part that has a rounded shape in a cross-sectional view and has a straight line shape in a longitudinal direction.

10. The separator coating apparatus of claim 4, wherein:
    an inner side surface of the supporter is perpendicular to a plane of the first holder part, and
    a connecting part of an upper end of the inner side surface and an upper end of the outer side surface is provided with a roller that has a straight line shape in a longitudinal direction.

11. The separator coating apparatus of claim 4, wherein:
    an inner side surface of the supporter is perpendicular to a plane of the first holder part, and
    a connecting part of an upper end of the inner side surface and an upper end of the outer side surface forms a screw shape in a roller that has a straight line shape in a longitudinal direction.

12. A separator coating apparatus for coating an organic slurry on a separator, the apparatus comprising:
    a coating bar that rotates in a transferring direction of the separator and coats the organic slurry on the separator;
    a bar holder spaced apart from the coating bar such that a gap is present between the bar holder and the coating bar, the organic slurry being supplyable into the gap and onto the rotating coating bar;
    a coating block that supplies the organic slurry into the gap through a supply passage at both sides of the bar holder relative to the transferring direction of the separator; and
    a supporter on the bar holder and facing the coating bar, the supporter extending a meniscus of organic slurry between the supply passage and the gap between the bar holder and the coating bar at an outflow side of the separator,
    wherein an outer side surface of the supporter is inclined with respect to a vertical line of a plane of the bar holder so as to accommodate the meniscus of the organic slurry.

13. The separator coating apparatus of claim 12, wherein:
an inner side surface of the supporter is connected to an upper end of the outer side surface and is parallel to the vertical line of the plane of the bar holder.

* * * * *